Oct. 31, 1933.  A. N. MERLE  1,933,066
FILM PRESSING DEVICE FOR MOTION PICTURE APPARATUS
Filed June 27, 1930   3 Sheets-Sheet 1
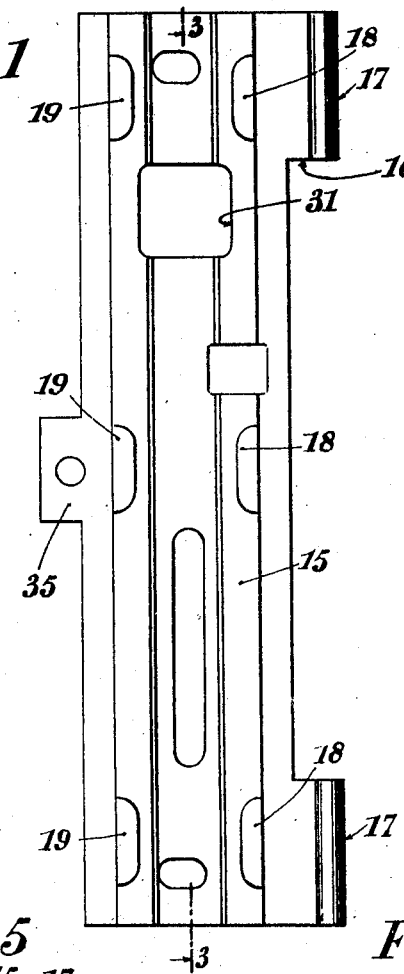
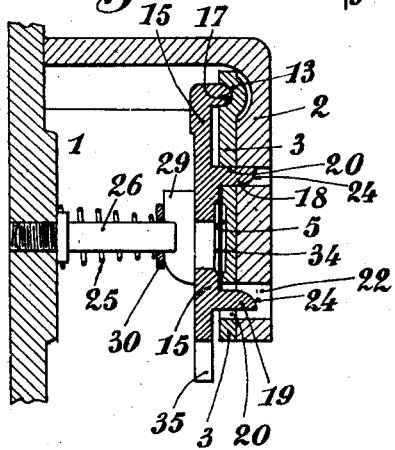
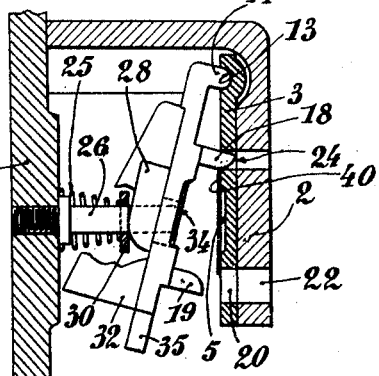
André Noël Merle
INVENTOR:
By (signature)
his Attorney Oct. 31, 1933.　　　A. N. MERLE　　　1,933,066
FILM PRESSING DEVICE FOR MOTION PICTURE APPARATUS
Filed June 27, 1930　　3 Sheets-Sheet 2
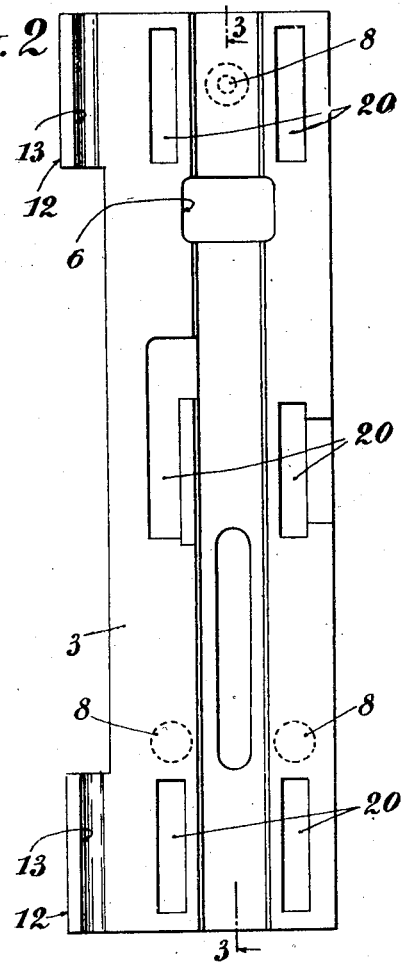
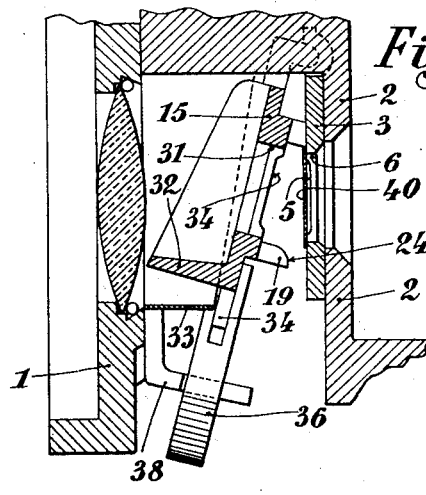
André Noël Merle
INVENTOR;
By (signature)
his Attorney.

Oct. 31, 1933.  A. N. MERLE  1,933,066
FILM PRESSING DEVICE FOR MOTION PICTURE APPARATUS
Filed June 27, 1930   3 Sheets-Sheet 3
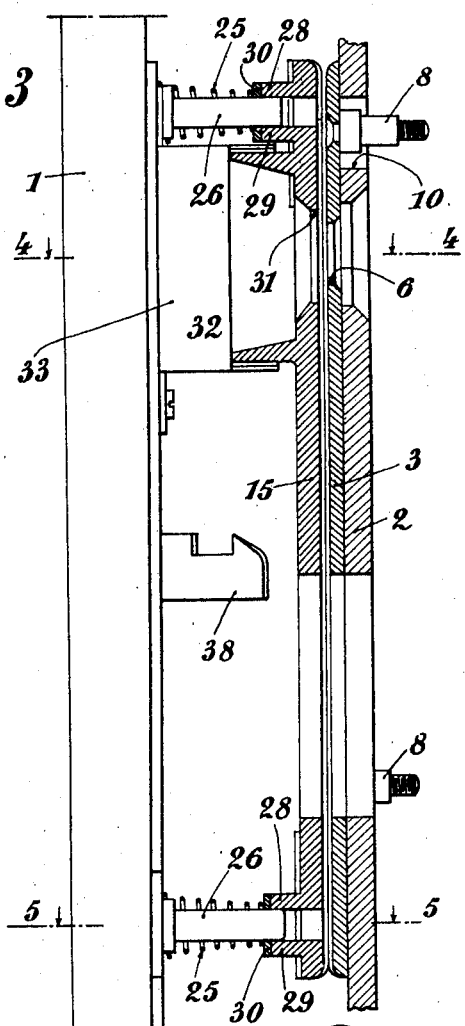
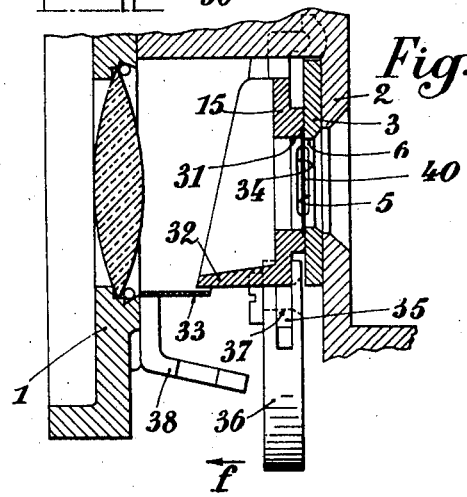
André Noël Merle
INVENTOR;
By [signature]
Attorney.

Patented Oct. 31, 1933

1,933,066

UNITED STATES PATENT OFFICE 1,933,066

FILM PRESSING DEVICE FOR MOTION PICTURE APPARATUS

André Noël Merle, Vincennes, France, assignor to Pathe Cinema, Anciens Etablissements Pathe Freres, Paris, France Application June 27, 1930, Serial No. 464,182, and in France May 7, 1930

10 Claims. (Cl. 88—17)

This invention has for its object a film pressing device for motion picture apparatus, particularly characterized in that the spring controlled pressure-plate is pivotally mounted on the frame about hinges, like a door.

According to another characteristic of the invention, means are provided whereby the pressure plate is suitably guided in the lateral direction across the film and is also prevented from moving vertically with the gate.

Other characteristics will be disclosed in the course of the following description.

In the accompanying drawings given solely by way of example:

Fig. 1 is a front view of the pressure plate;

Fig. 2 is a front view of the film gate;

Fig. 3 is a vertical section on line 3—3 of Figures 1 and 2 of the gate and pressure plate when the latter is closed.

Fig. 4 is a horizontal section of the pressure plate and gate on line 4—4 of Fig. 3;

Fig. 5 is a horizontal section of the pressure plate and gate on line 5—5 of Fig. 3;

Fig. 6 is a view similar to that shown on Fig. 4, the pressing device being open;

Fig. 7 is a view similar to that shown on Fig. 5, the pressing device being open to show the position of the compression springs.

In the construction illustrated, 1 is the rear part and 2, the front part of the frame of the apparatus. On the front part is guided a gate 3 shown in Fig. 2 along which the film is adapted to slide. In said gate is formed a longitudinal groove or channel 5 (Figure 5) as usual, so that the film will bear upon the gate by its edges, 6 is the exposure aperture formed in the gate and having the dimensions of the image. The gate 3 is carried by screws 8 (Figure 3) which extend through vertical slots in the frame and may be moved upwardly and downwardly for framing the image. The gate has, at one side, at the top and at the bottom, lugs 12 provided with vertical grooves or sockets 13, which may have, as shown, a semi-circular cross-section.

The pressure plate 15, shown in Figure 1, is a metal member provided with two lateral lugs 16 having ribs 17 of semi-circular cross-section which engage into the slots 13 of the gate, so as to form a hinge joint. The ribs are adapted to slide vertically in the slots 13, so as to allow movement of the gate upwardly or downwardly for framing.

The pressure plate 15 is also provided on its front face with two vertical sets of projecting lugs 18, 19 (Figure 3) acting as guides, which are for instance six in number (three on each side) and which are adapted to extend through openings 20 of the gate and corresponding apertures 22 of the frame. The outer end of said guides is rounded or bevelled at the inside as shown at 23. The distance between the guides 18, 19 at their inner ends, corresponds to the width of the film. The outer face of the guides is at right angles to the pressure plate.

It will be noted that the guides 18, 19 have a certain amount of play in the openings 20 in the vertical direction, whereby the gate can be moved vertically for framing purposes. Moreover, the inner guides 18, i. e. those located near the hinge, fit in the openings 20 in the lateral direction with a very slight play in order to suitably guide and hold the pressure plate and the film in the gate in the lateral direction. The three outer lugs 19 have a greater lateral play in the corresponding apertures 20, so as to allow for the pivotal movement of the pressure-plate.

The pressure plate 15 is urged towards the gate by two coil-springs 25 mounted on studs 26 secured to the frame 1 of the apparatus. The outer ends of each stud 26 extend into the space between two horizontal projections or jaws 28, 29 provided on the pressure-plate, the studs engaging with a snug fit between the projections in the vertical direction so as to prevent all vertical movement of the pressure plate. The springs 25 bear upon washers 30 which are pressed thereby against the said projections, the latter being rounded at one end so that the springs will always press in a normal direction to the outline of the projections during the pivotal movement of the pressure plate.

An exposure opening 31 having greater dimensions than the image is provided in the pressure-plate. Around said opening is provided a hood or mask 32 shaped as a truncated prism, adapted to screen the light and to prevent it from leaving the projector sidewise. The rear frame 1 of the projector is also provided with a hood or mask 33, secured thereto, which is wider than hood or mask 32 and fits over the latter when the pressure-plate is opened. The pressure plate has also formed therein a longitudinal groove or channel 34 (Figure 5) similar to the groove 5 of the gate.

Upon a lug 35 (Figure 1) on the pressure plate, is mounted a latch 36 adapted to pivot about a horizontal axis 37. Said latch, which is used for opening and locking the pressure plate, is disposed to fit into a hook 38 (Figure 3) secured to the frame. Such device allows the pressure plate to remain open during the time when handling the film is necessary and thus enables the operator to have both hands free.

The operation is as follows: In order to load the apparatus, the pressure plate 15 is moved rearwardly by acting on the latch 36 in the direction of arrow *f* (Figure 4), the pressure plate being thus caused to pivot about its hinges 13—17. The latch 36 will engage the hook 38 and the pressure plate is thus locked in the open position (Figures 6 and 7). In this manner, the operator has the free use of both hands to carry out the loading of the apparatus.

In this movement, the outer guides 19 come out of the openings 20 of the gate 3 and diverge sufficiently from the latter to allow introduction of the film. The inner guides 18 remain in engagement with the openings in the gate.

The film 40 is introduced through the space between the outer guides 19 and the gate. The edge of the film will thus bear against the inner guides 18, which limit the admission of the film into the gate and secure therefore an accurate position of the film when the pressure plate is shut.

The latch 36 is then released from hook 38 and the pressure plate is moved under pressure of the springs 25 to press the film against the gate, the film being exactly positioned in the pressure plate due to the bevelled or rounded edges 24. The feeding of the film can thus be proceeded with.

It will be noted that the arrangement of hinges above described enables the pressure plate to move away from the gate according to variations in the film thickness. Moreover, the film is firmly secured in position and pressure from springs 25 is fully distributed over the whole contact surface.

Obviously, the invention is in no way restricted to the construction herein shown and described, which is only given by way of example.

Having now described my invention what I claim as new and desire to secure by Letters Patent is:

1. In a cinematograph apparatus, a gate member, guiding means for the gate whereby said gate is adapted to be displaced vertically for framing purposes, a pressure plate, the gate and pressure plate having hinge projections and sockets in mutual engagement, allowing a vertical displacement of the gate with relation to the pressure plate, means for yieldingly urging the pressure plate against the gate and means adapted to prevent the pressure plate from moving vertically.

2. In a cinematograph apparatus, a gate member provided with vertical slots, guiding means for the gate whereby said gate is adapted to be displaced vertically for framing purposes, a pressure plate, lugs on said pressure plate adapted to be engaged into said slots for centering the pressure plate in a lateral direction on the gate, the gate and pressure plate having hinge projections and sockets in mutual engagement, allowing a vertical displacement of the gate with relation to the pressure plate, means for yieldingly urging the pressure plate against the gate and means adapted to prevent the pressure plate from moving vertically.

3. In a cinematograph apparatus, a gate member for the film provided with vertical slots on both sides of the path of the film, guiding means for the gate whereby said gate is adapted to be displaced vertically for framing purposes, a pressure plate, lugs on said pressure plate adapted to be engaged in said slots for centering the pressure plate in a lateral direction on the gate and for centering the film in a lateral direction on the pressure plate, the gate and pressure plate having hinge projections and sockets in mutual engagement, allowing a vertical displacement of the gate with relation to the pressure plate, means for yieldingly urging the pressure plate against the gate and means adapted to prevent the pressure plate from moving vertically.

4. In a cinematograph apparatus according to claim 1, a stationary hood on the frame of the apparatus and a hood on the pressure plate, said hoods being adapted to extend into each other.

5. In a cinematograph apparatus according to claim 1, a hook on the frame of the apparatus and a latch on the pressure plate, adapted to engage with said hook in the open position of said pressure plate.

6. In a cinematograph apparatus, a gate member provided with guiding means for the film, means for moving the gate with respect to the frame of the apparatus for framing purposes, a pressure plate, the gate and pressure plate having hinge projections and sockets in mutual engagement, upper and lower guiding jaws arranged transversally on the pressure plate, studs on the frame adapted to be engaged between said upper and lower guiding jaws, and springs for urging the pressure frame against the gate.

7. In a cinematograph apparatus according to claim 6, the said springs are mounted on said studs, so as to be adapted to press on said guiding jaws and the latter are provided with a curved bearing surface for the springs, whereby the pressure from the springs is exerted in a normal direction on said curved bearing surface in all positions of the pressure plate.

8. In a cinematograph apparatus, a gate member provided with guiding means for the film, means for moving the gate on the frame of the apparatus for framing purposes, a pressure plate, the gate and pressure plate having hinge projections and sockets in mutual engagement, means adapted to prevent the pressure plate from moving with the gate, a set of guiding lugs on the pressure plate, adapted to fit into corresponding openings of the gate, for centering the pressure plate on the gate in the lateral direction and means for yieldingly urging the pressure plate against the gate.

9. In a cinematograph apparatus according to claim 8, the pressure plate is also provided with an additional set of lugs, the distance between the two sets of lugs corresponding to the width of the film, whereby the film may be centered with relation to the pressure plate.

10. In a cinematograph apparatus according to claim 8, the pressure plate is also provided with an additional set of lugs, the distance between the two sets of lugs corresponding to the width of the film and the inner faces of the lugs at their outer ends having a flaring outline.

ANDRÉ NOËL MERLE.